(12) United States Patent
Kako et al.

(10) Patent No.: US 6,465,925 B2
(45) Date of Patent: Oct. 15, 2002

(54) ROTARY ELECTRIC MACHINE HAVING AUXILIARY POLES

(75) Inventors: Hiroshige Kako, Nagoya (JP); Masami Niimi, Handa (JP); Masahiro Katoh, Chiryu (JP); Masanori Ohmi, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/977,679

(22) Filed: Oct. 16, 2001

(65) Prior Publication Data

US 2002/0050757 A1 May 2, 2002

(30) Foreign Application Priority Data

Oct. 26, 2000 (JP) .......................... 2000-327290
Jan. 22, 2001 (JP) .......................... 2001-013360

(51) Int. Cl.⁷ ..................... H02K 21/26; H02K 21/28
(52) U.S. Cl. ..................... 310/156.16; 310/154.14; 310/154.16; 310/154.17
(58) Field of Search ..................... 310/154, 153, 310/106, 154.14, 154.15, 154.17, 156.16

(56) References Cited

U.S. PATENT DOCUMENTS 5,838,079 A * 11/1998 Morohashi ............... 310/12

FOREIGN PATENT DOCUMENTS

| EP | 1035629 A2 | 9/2000 |
|---|---|---|
| JP | B2-57-12380 | 3/1982 |
| JP | B2-8-10981 | 1/1996 |
| JP | A-8-168223 | 6/1996 |
| JP | A-9-285090 | 10/1997 |

* cited by examiner

Primary Examiner—Thomas M. Dougherty
Assistant Examiner—Iraj A Mohandesi
(74) Attorney, Agent, or Firm—Law Offices of David G. Posz

(57) ABSTRACT

A rotary electric machine includes a plurality of permanent magnet main poles disposed on an inner periphery of a yoke and a plurality of auxiliary poles respectively disposed between neighboring two of the main poles via magnet fixing members and a plurality of magnet fixing members. The magnet-fixing member is comprised of a U-bent elastic metal plate having a pair of circumferentially opposite walls that provides a pole space. The opposite walls are respectively bent inward at edges thereof in circumferentially opposite directions to be opposed to each other. The bent edges have and elastic projections and are separated at the axial ends to form an elastic retaining member. The auxiliary pole is inserted into the auxiliary pole space by opening the elastic retaining member.

8 Claims, 5 Drawing Sheets

ROTARY ELECTRIC MACHINE HAVING AUXILIARY POLES

CROSS REFERENCE TO RELATED APPLICATION

The present application is based on and claims priority from Japanese Patent Applications 2000-327290 filed Oct. 26, 2000 and 2001-13360 filed Jan. 22, 2001, the contents of which are incorporated herein by reference.

BACKGROUND OF THE INVENTION

1. Field of the Invention

The present invention relates to a rotary electric machine that has a plurality of permanent magnet main poles and a plurality of auxiliary poles disposed between neighboring main poles.

2. Description of the Related Art

As a prior art, JP-A-2000-261989 or EP1035629A2, which corresponds to the former publication, discloses a DC motor.

This DC motor has a plurality of circumferentially disposed main poles, a plurality of auxiliary poles each of which is disposed between neighboring two of the main poles and a plurality of magnet fixing members for fixing the main poles and the auxiliary poles.

As shown in FIGS. 9A and 9B of EP1035629A2, the magnet fixing member is formed from a U-bent elastic metal plate that has opposite side walls, between which an auxiliary-pole space is formed to hold an auxiliary pole. The opposite side walls are bent inwardly to be opposed to each other at edges thereof, and axial ends of the bent edges are separated from the side walls to form elastic retaining members.

The auxiliary pole is inserted into the auxiliary-pole space of the magnet fixing member after an elastic retaining member is opened inwardly in a radial direction. The auxiliary pole is restricted to shift in axial directions by a stopper that is formed at an end of the elastic retaining member. The auxiliary pole is also supported in the radial direction both by cutout pieces cut from an upper wall surface of the magnet fixing member at radially outside surface and by the bent edge at the inner periphery thereof.

The elastic retaining member of the bent edge is slightly curled upward at the end thereof from the bent edge when the auxiliary pole is not inserted in the auxiliary pole space. Therefore, when the auxiliary pole is inserted into the auxiliary pole space, the elastic retaining member and the bent edge are brought into the same plane so that the elastic retaining member provides spring force. Accordingly, the auxiliary pole is prevented from shifting in the radial directions when the outside surface of the auxiliary pole is supported by the cutout pieces.

The elastic retaining member has to have a suitable length to open radially inward when the auxiliary pole is inserted in the axial direction. Accordingly, the spring force of the elastic retaining member is too small to prevent the auxiliary pole from shifting in the radial directions while the auxiliary pole is disposed in the auxiliary pole space.

The auxiliary pole may shift in the radial direction due to vibration of the armature during rotation and armature reaction, and the elastic retaining member may bend inward, thereby to interfere with the armature.

The shifting of the auxiliary pole gives such excessive stress on the elastic retaining member that the elastic retaining member may be cut off.

JP-B2-57-12380 discloses a rotary electric machine of this kind. In this rotary electric machine, an auxiliary pole is disposed between two neighboring main poles so that a pair of circumferentially opposite pole surfaces of the auxiliary pole can have the same polarities as the polarities of the armature-side of neighboring main poles. Thus, leakage magnetic flux between the main poles are controlled to increase effective magnetic flux supplied to the armature via air gap. Therefore, the output power of the rotary electric machine can be increased without increasing the size of the rotary electric machine. In other words, the size of the rotary electric machine can be reduced without reducing the output power thereof.

While the rotary electric machine is operating, current flows in the armature. As a result, a magnetic flux distribution is formed due to armature reaction. The magnetic flux distribution forms triangular curves, which have a peak between the neighboring main poles or at the auxiliary pole, as shown in FIG. 9. The amount of the magnetic flux at the auxiliary poles is larger than the amount of the magnetic flux at the main pole. In other words, the auxiliary poles are more affected by the armature reaction than the main poles. The auxiliary poles are affected and demagnetized by the magnetic flux of the armature reaction that is different in direction from the magnetic flux of itself. If the armature reaction is too large, the auxiliary poles are irreversibly demagnetized, and the flux density thereof will not return to the initial magnetic flux density after the armature reaction is removed. As a result, the auxiliary poles will not effectively control the leakage flux between the main poles, resulting in lowering the output power of the rotary electric machine.

SUMMARY OF THE INVENTION

The present invention has been made in view of the above circumstances, and an object of the invention is to provide an improved rotary electric machine in which elastic retaining members from being cut off or from deforming badly.

According to a main feature of the invention, a magnet fixing member is comprised of a U-bent elastic metal plate having a pair of circumferentially opposite walls that provides an auxiliary pole space for holding an auxiliary pole therein, the opposite walls are respectively bent inward at edges thereof in circumferentially opposite directions to be opposed to each other, the bent edges are separated at the axial ends to form an elastic retaining member that can elastically deform in radial directions and has an elastic projection at a portion thereof, and the auxiliary pole is inserted into the auxiliary pole space after opening the elastic retaining member radially inward in an axial direction so as to be held radially outward by the elastic retaining member.

Therefore, the auxiliary pole in the auxiliary pole space is biased radially outward by the elastic projection to be fixed tightly. Accordingly, the load applied to the elastic retaining member can be made small so that shift due to the vibration while the armature is rotating and armature reaction can be prevented.

In the rotary electric machine according to another feature of the invention, the elastic projection comprises a convex portion of the bent edge.

In the rotary electric machine according another feature of the invention, the magnet fixing member has a plurality of outside supporting portions for supporting the auxiliary pole that is biased radially outward by the elastic projection.

Therefore, the auxiliary pole can be supported at the outer periphery thereof by a plurality of portions. The auxiliary pole can be more fixedly and stably supported by the plurality of portions than by the surface of the magnet fixing member.

In the rotary electric machine according another feature of the invention, the magnet fixing member has a base wall that faces radially outer surface of the auxiliary pole, and the outside supporting portion is formed from a portion that is cut and bent radially inward from the base wall.

Therefore, the outside supporting portions can be formed easily, and the number of the outside supporting portions can be easily changed.

In the rotary electric machine according to another feature of the invention, the elastic retaining member is formed at opposite axial ends of the bent edge and has a stopper for retaining an axial end surface of the auxiliary pole.

Therefore, the auxiliary pole can be prevented from shifting in the axial directions so that the auxiliary pole can be fixed more stably.

Another object of the invention is to provide a reliable rotary electric machine that will prevent the auxiliary poles from being demagnetized and maintain the leakage flux control function of the auxiliary poles to prevent lowering the output power by suitable selection of the magnetic characteristics of the auxiliary poles.

In a rotary electric machine according to another main feature of the invention, coercive force of auxiliary poles is set to a value that is high enough to prevent the auxiliary poles from being irreversibly demagnetized by a maximum armature reaction of said rotary electric machine. Therefore, the irreversible demagnetization of the auxiliary pole can be prevented so that the auxiliary poles can effectively suppress magnetic leakage among the main poles. Accordingly, the output power of the rotary electric machine can be maintained for long time.

Particularly, according to another feature of the invention, the coercive force of the auxiliary poles is set larger than the coercive force of the main poles, so that the main poles can employ less expensive material than the auxiliary poles. As a result, the rotary electric machine can have a stable magnetic leakage suppressing function of the main poles without increasing production cost.

In the rotary electric machine according to another feature of the invention, remnant magnetic flux density of the auxiliary poles is set so that remnant magnetic flux density after the auxiliary poles is irreversibly demagnetized by a maximum armature reaction of the rotary electric machine is still higher than a predetermined value. Therefore, even after the auxiliary poles are demagnetized due to the maximum armature reaction of the rotary electric machine in operation, the auxiliary poles maintain a magnetic flux density that can sufficiently suppress the magnetic leakage of the main poles so that the output power of the rotary electric machine can be stably maintained.

In particular, according to another feature of the invention, the magnetic flux density of the auxiliary pole is set lower than that of the main pole. Therefore, the main poles can use less expensive material than the auxiliary poles, so that the rotary electric machine can have auxiliary poles that effectively suppress the magnetic leakage of the main poles without increasing cost thereof.

In the rotary electric machine according to another feature of the invention, the maximum armature reaction of the rotary electric machine is caused by locked-rotor current flowing while the rotary electric machine is being started. Generally, the maximum armature current is locked-rotor current flowing while the rotary electric machine is started. Therefore, the function of the auxiliary poles is prevented from lowering due to the maximum armature reaction of the rotary electric machine in operation.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
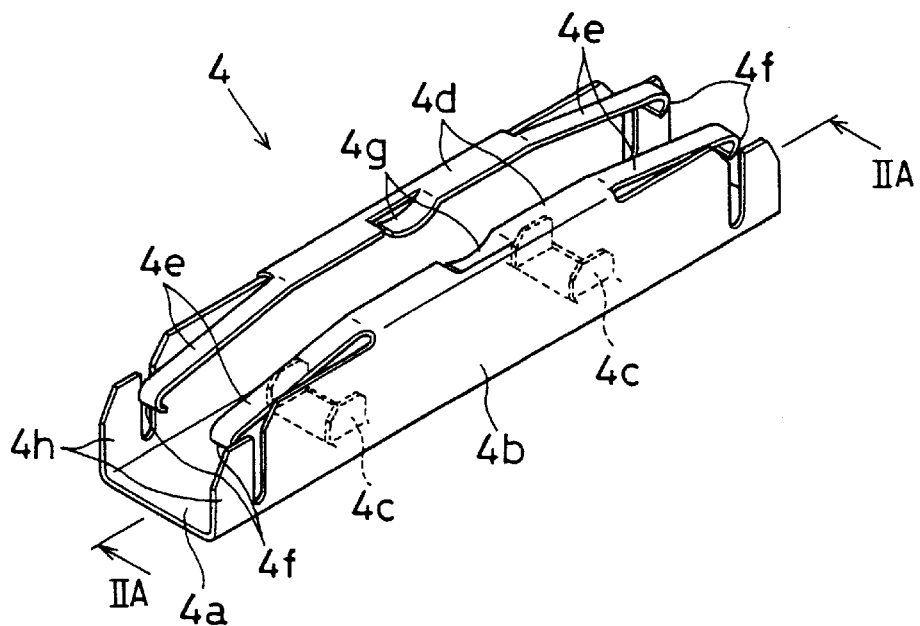
FIG. 1 is a perspective view of a magnet fixing spring.

A first embodiment of the invention is described with reference to FIGS. 1–3.

A DC motor 1, which is one of a rotary electric machine, is used for a vehicle starter. As shown in FIG. 3, a plurality of permanent magnets is disposed on the inner periphery of a yoke 3 at equal intervals to provide main poles 2. A plurality of auxiliary poles 5 is also disposed on the inner periphery of the yoke 3 so that each is disposed, via a magnet fixing spring 4, between each pair of the adjacent main poles 2.

The permanent magnets used for the main poles 2 are magnetized in the radial direction to alternately provide N and S poles in the circumferential direction.

Permanent magnets are also used for the auxiliary poles 5, which are magnetized to provide S-pole and N-pole in the circumferential direction so that the polarity of the auxiliary poles 5 can be the same as the polarity of the main poles 2 at the inner periphery thereof.

Figure 2A:
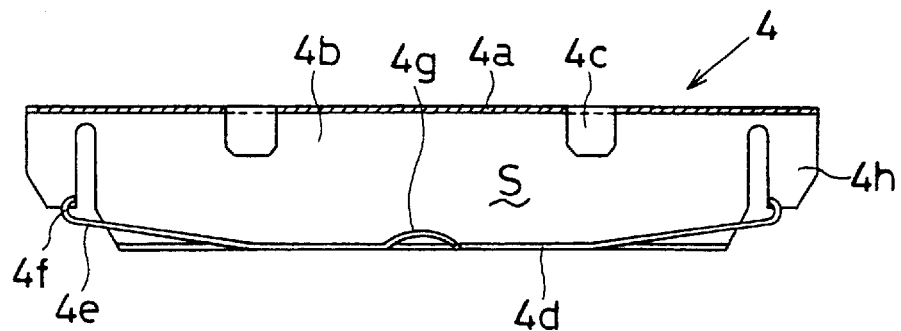
FIGS. 2A, 2B and 2C are explanatory diagrams illustrating steps of assembling an auxiliary pole into the magnet fixing spring.

The magnet fixing spring 4, as shown in FIG. 1, is a U-bent elastic metal plate (e.g. stainless steel), having an auxiliary pole space S, as shown in FIG. 2A, in which one of the auxiliary poles 5 is inserted.

The magnet fixing spring 4 has a base wall 4a and a pair of side walls 4b. The base wall 4a has a plurality of outer periphery supporting portions 4c. The outer periphery supporting portion 4c supports the outer periphery of the auxiliary pole 5 that is disposed in the auxiliary pole space S. The outer periphery supporting portion 4c is a portion of the base wall 4a cut out and extended from the base wall 4a.

The opposite side walls 4b of the magnet fixing spring 4 are bent so that the inner edges thereof can face each other in the circumferential direction to form bent edges 4d, the axially opposite ends of which are separated from the side walls to form radially swingable elastic retaining members 4e. The axial ends of the elastic retaining member 4e are curled toward the base wall 4a to form stoppers 4f that support the axial ends of the auxiliary pole 5. An elastic projection 4g is formed at the middle of the bent edge 4d. The elastic projection 4g is a portion of the bent edge 4d that is formed to project toward the base wall 4a to provide a suitable elasticity.

A step of fixing the main pole 2 and the auxiliary pole 5 by the magnet fixing spring 4 is described next.

At first, the auxiliary pole 5 is inserted into the magnet fixing spring 4 in an axial direction. As shown in FIG. 2A, the elastic retaining member 4e is slightly lifted from the bent edge 4d before the auxiliary pole 5 is inserted. Therefore, the auxiliary pole 5 is inserted while the elastic retaining member 4e is slightly lowered to open.

Figure 2B:
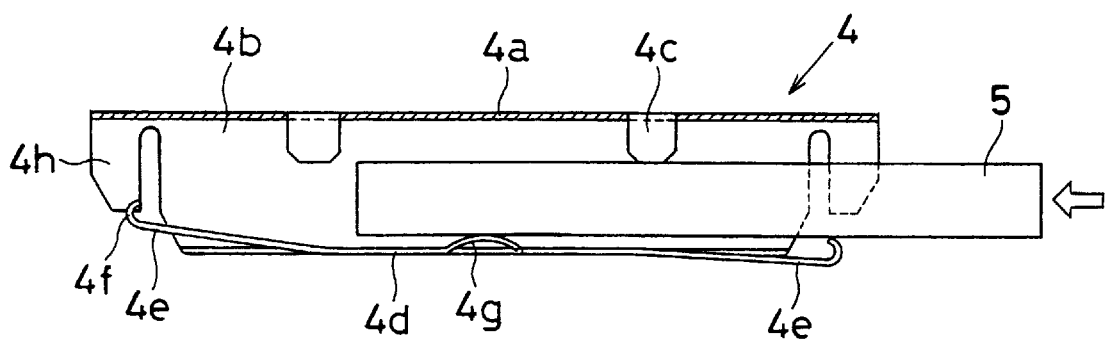

As shown in FIG. 2B, the auxiliary pole 5 is inserted in to the magnet fixing spring 4 through the space between the outer periphery supporting portion 4c of the base wall 4a and the elastic projection 4g of the bent edge 4d into the auxiliary pole space S.

Figure 2C:
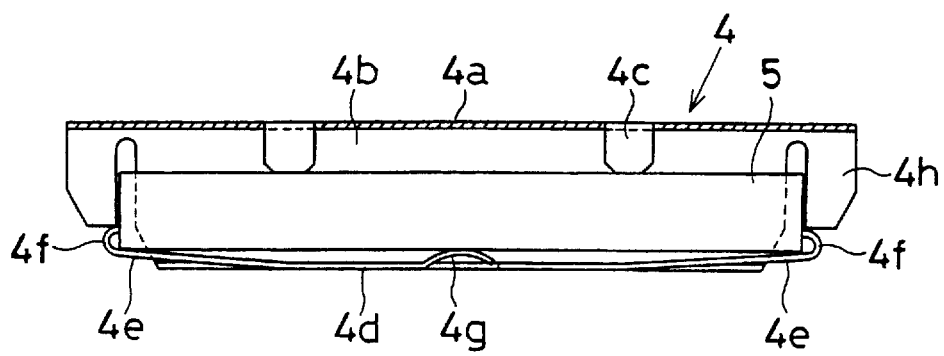

As shown in FIG. 2C, the auxiliary pole 5 in the auxiliary pole space S is biased outward (downward in FIG. 2C) by the elastic projection 4g, so that it is held between the elastic projection 4g and the outer periphery supporting portion 4c.

Thus, the stoppers 4f of the elastic retaining member 4e support the auxiliary pole 5 in the axial directions to restrict axial shift thereof.

Thereafter, one of the magnet fixing springs 4 with the auxiliary pole 5 therein is inserted between the circumferentially neighboring main poles 2. In the magnet fixing spring 4, the circumferential width of the base wall 4a is approximately equal to the distance between the circumferentially neighboring auxiliary poles 5, and the side walls 4b slightly open outward. Accordingly, while the magnet fixing spring 4 is disposed between the two main poles 2 to bias the side walls of the main poles 2 in the circumferential directions, it is held between the main poles 2 by its counteraction.

The main pole 2 is tightly held by the spring force of the magnet fixing springs 4 from opposite sides.

Figure 3:
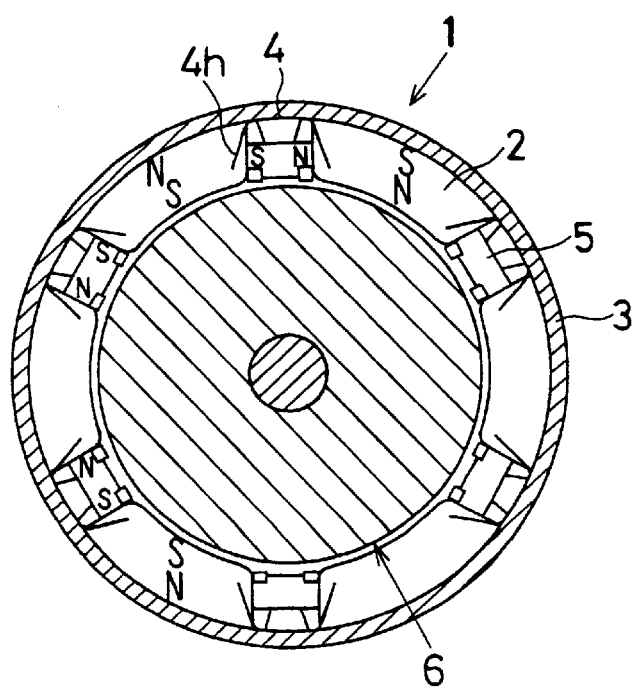
FIG. 3 is a cross-sectional view of a DC motor.

Thereafter, as shown in FIG. 3, two pairs of stoppers 4h are opened outward to support the main poles 2 at the axially opposite ends thereof, whereby the main poles 2 can be prevented from axially shifting.

The magnet fixing spring 4 provides spring force with the elastic projection 4g of the bent edge 4d so that the spring force biases the auxiliary pole 5 in the auxiliary pole space S radially outward to tightly hold the same between the elastic projection 4g and the outer periphery supporting portion 4c.

As a result, all the spring force to hold the auxiliary pole 5 is provided by the elastic projection 4g. Therefore, the elastic retaining member 4e has to bear only small load. In addition, shifting of the auxiliary pole 5 due to vibration of the armature 6 while rotating or armature reaction can be prevented, and the elastic retaining member 4e can be prevented from breaking down or deforming. This also prevents the elastic retaining member from interfering with the armature 6.

A rotary electric machine, as an engine starting motor, according to a second embodiment of the invention is described with reference to FIG. 4. In the meanwhile, the same reference numeral as the first embodiments corresponds to the same or substantially the same part or component as the first embodiment, hereafter.

The rotary electric machine 1 is disposed inside a cylindrical yoke 3 and is comprised of armature 6 rotatably disposed inside the yoke 3.

The armature 6 is comprised of a shaft 7 rotatably supported inside the yoke 3, an armature core 8 fixed to the shaft 7, an armature coil (not shown) and a commutator (not shown) which a positive side brush (not shown) and a negative side brush (not shown) contact.

Figure 7:
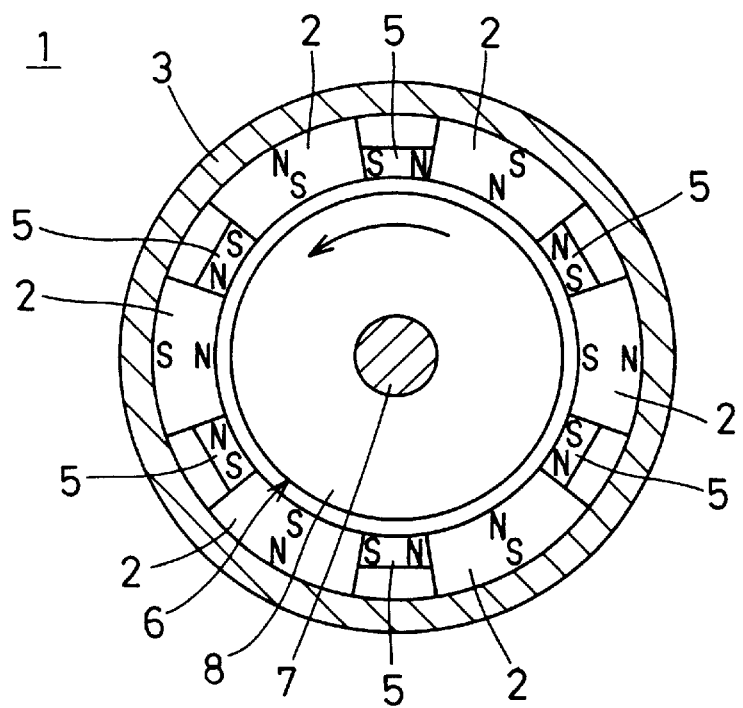
FIG. 7 is a schematic cross-sectional view of the rotary electric machine according to the first embodiment.
Figure 8:
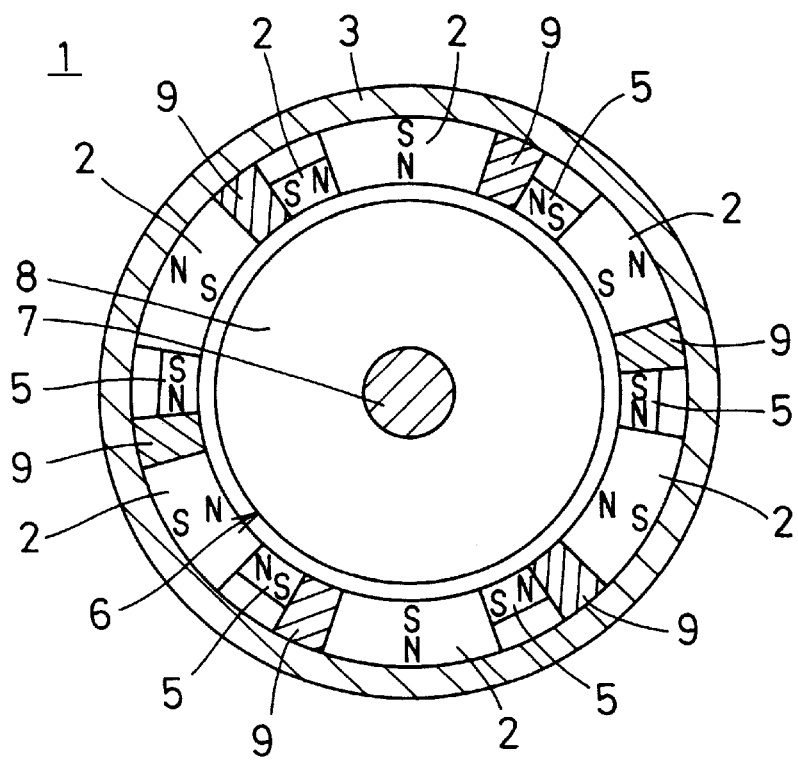
FIG. 8 is a schematic cross-sectional view of a rotary electric machine according to a variation of the first and second embodiment.

A plurality (six in the first embodiment) of main poles 2 for supplying magnetic flux to the armature coil, a plurality (six in the first embodiment) of auxiliary poles 5 disposed among the main poles to increase effective magnetic flux. The main poles 2 are permanent magnets having polarities extending in the direction from the yoke 3 to the armature 6. As shown in FIG. 7, the N and S poles are alternately disposed on the side of the armature at equal intervals or 60 degree in mechanical angle. One of the auxiliary poles 5 is disposed between the neighboring two main poles and has the circumferential pole axis extending through the neighboring main poles on the opposite sides thereof. The auxiliary pole 5 has the same polarity as the main pole 2 that is adjacent thereto.

Magnetic characteristic curves and magnetic materials of the auxiliary poles 5 will be discussed next with reference to FIGS. 4–6. The vertical axis represents magnetic flux density B and the horizontal axis represents magnetic field strength H. The magnetic flux density Br is remnant magnetic flux density of the auxiliary poles 5 when the magnetic field strength H=0. An operation point A of the auxiliary poles 5 is an intersection point intersected by a permeance line P. The B–H characteristic curve is straight in the range left from the operation point A in FIG. 5 and steeply curved down in the range left from the critical point C. The B–H characteristic curve shown in FIG. 5 is suitable for the auxiliary poles 5 to suppress the magnetic flux leakage.

At first, the magnetic character of the auxiliary poles 5 in operation will be discussed below.

When no armature reaction exists, magnetic flux density at an operation point A of the auxiliary poles 5 is B0. When the rotary electric machine 1 operates and a counter magnetic field –H1 is generated due to the armature reaction, the permeance line parallelly shifts to the left so that the operation point shifts to a point D. If the counter magnetic field –H1 disappears at this point, the operation point of the auxiliary poles 5 returns to the point A along the B–H curve. In other words, there is no irreversible demagnetization.

If a counter magnetic field –H2 of maximum armature reaction is generated, the permeance line P further shifts to the left so that the operation point of the auxiliary poles 5 passes the critical point C and reaches a point E. If the counter magnetic field disappears at this state, the operation point does not return to the point A but shifts right to a point A' along a line E-A' that is parallel with the original line C-A. The point A' is an intersected point of the permeance line P and the line E-A'. The magnetic flux density at the point A' is B1, which is smaller than B0. In other words, there is irreversible demagnetization of the auxiliary poles, which is a difference between B0 and B1 due to the counter magnetic field –H2 in this case. The B-H curve of the auxiliary poles 5 after the irreversible demagnetization is a line A'-ET, which can not suppress the magnetic leakage of the main poles 4.

How to select material of the auxiliary poles 5 will be discussed next.

Figure 4:
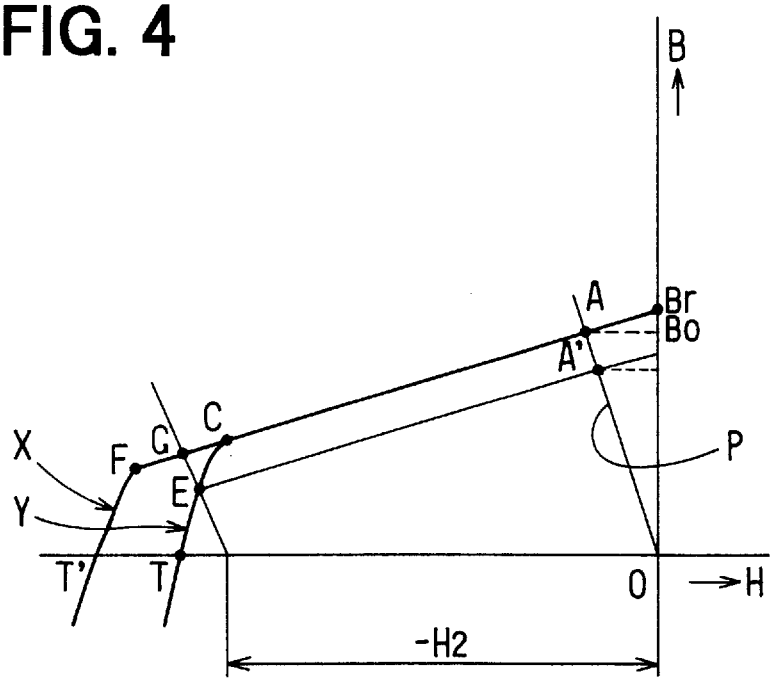
FIG. 4 is a graph showing B–H curves of two different permanent magnets to be used for auxiliary poles of a rotary electric machine according to a first embodiment of the invention.
Figure 5:
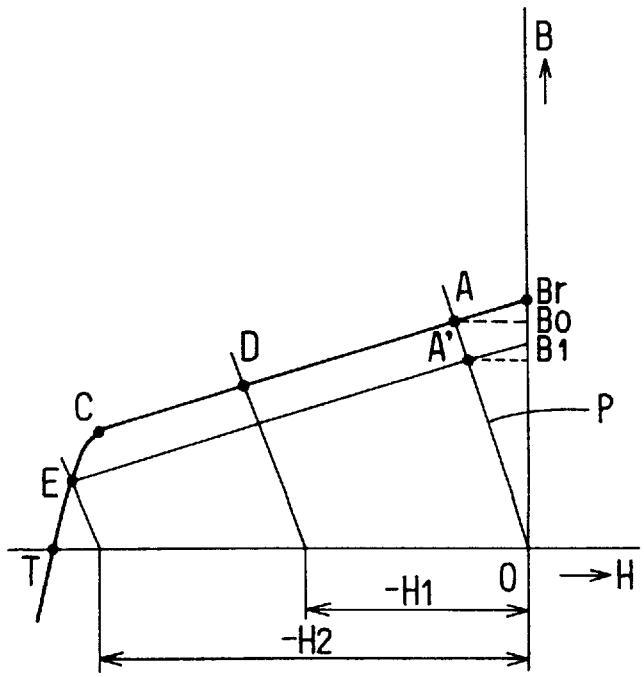
FIG. 5 is a graph showing B–H curves of the auxiliary poles.

B-H curves of two kinds of permanent magnet materials X and Y for the auxiliary poles 5 of the rotary electric machine 1 are shown in FIG. 4. The B-H curve of the permanent magnet Y is the same as the B-H curve shown in FIG. 5. The critical point F of the B-H curve of the permanent magnet material X is left from the critical point C of the B-H curve of the permanent magnet Y. In other words, the coercive force of the permanent magnet X is larger than the coercive force of the permanent magnet Y.

If the counter magnetic field –H2 due to the maximum armature reaction is applied to the rotary electric machine 1, the operation point of the auxiliary poles 5 made of the permanent magnet material X comes to a point G. The point G is right from the point F, which is in a straight line of the B-H curve. Therefore, if the counter magnetic field –H2 disappears, the operation point of the auxiliary poles 5 returns to the point A. In other words, there is no irreversible demagnetization. As a result, the auxiliary poles 5 made of the permanent magnet material X, which has stronger coercive force, can prevent irreversible demagnetization even if the counter magnetic field –H2 due to the maximum armature reaction is applied thereto.

The maximum armature reaction will be briefly discussed next. Generally, the magnitude of the armature reaction of the rotary electric machine 1 is proportional to an amount of the current flowing in the armature coil (not shown). In case of an engine starting motor, the maximum current flowing in the armature coil is locked-rotor current when a key switch is turned on and the rotary electric machine 1 is just energized but before the armature starts rotation. Incidentally, the locked-rotor current becomes larger as battery capacity increases and temperature thereof lowers. Therefore, the armature reaction of the rotary electric machine 1 becomes maximum if it is used under a lowest temperature with a battery of a largest capacity. The permanent magnetic material of the auxiliary poles 5 should be selected according to the above information.

As discussed above, the auxiliary poles 5 use permanent magnet material X of a high coercive force that would not be irreversibly demagnetized so that the auxiliary poles 5 can suppress the magnetic leakage of the main poles 2, thereby preventing the output power of the rotary electric machine 1 from lowering.

Figure 9:
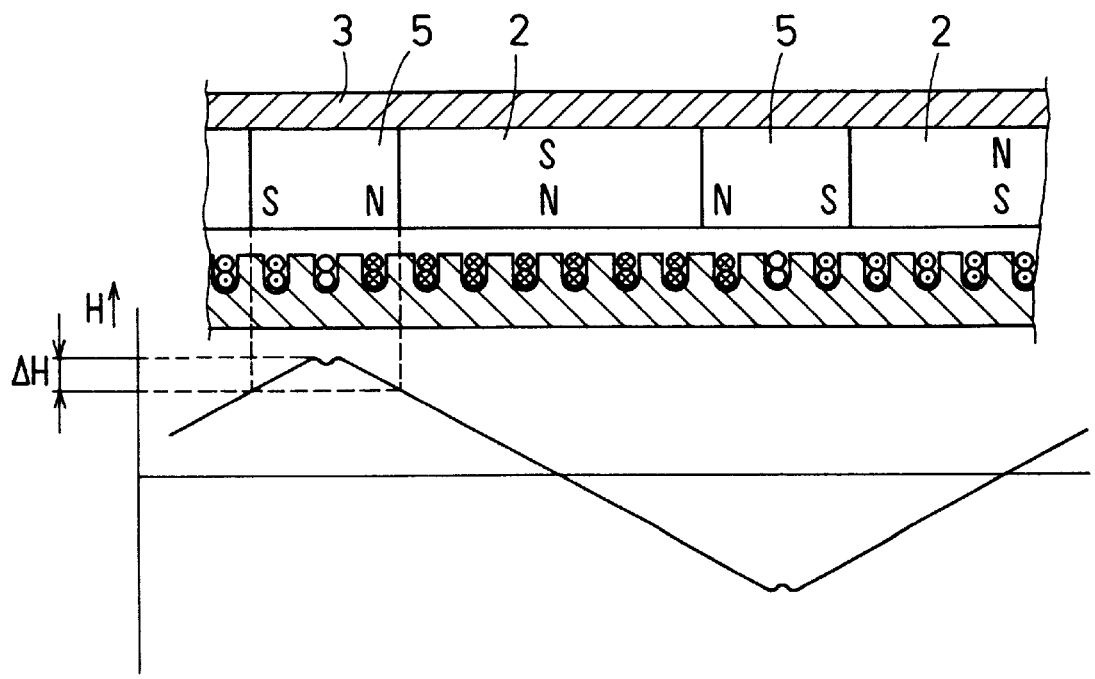
FIG. 9 is an exploded view of a magnetic poles and an armature and an explanatory diagram illustrating magnetic flux distribution of armature reaction in an ordinary permanent magnet type rotary electric machine.

On the other hand, the counter magnetic field applied to the main poles 2 due to the maximum armature reaction is smaller than the counter magnetic field applied to the auxiliary poles 5, as shown in FIG. 9. Therefore, the permanent magnet material of the main poles 2 can be smaller in coercive force and less expensive than the permanent magnet material X of the auxiliary poles 5.

In a rotary electric machine 1 according to a third embodiment of the invention, how to select the material of the auxiliary poles 5 is different, as will be discussed below.

Figure 6:
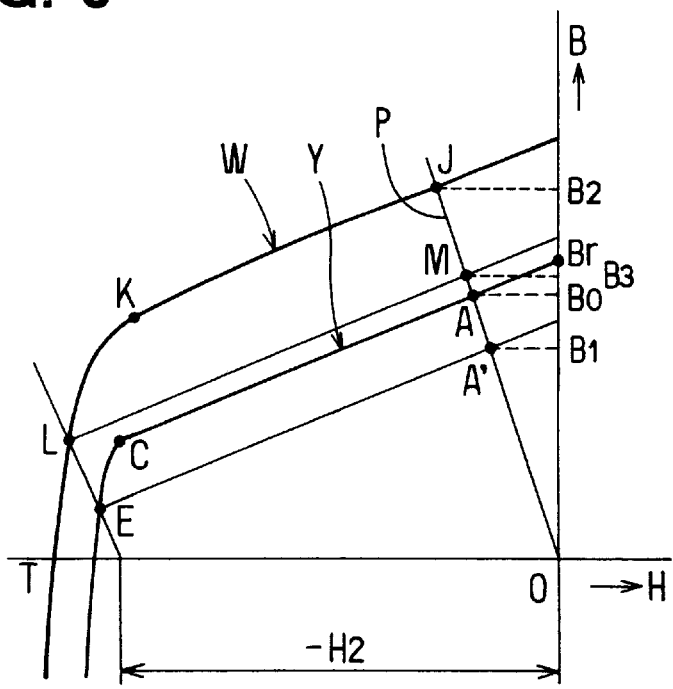
FIG. 6 is a graph showing B–H curves of two different permanent magnets to be used for the auxiliary poles of a rotary electric machine according to a second embodiment of the invention.

In FIG. 6, B-H curves of the auxiliary poles 5 using two kinds of permanent magnet materials w and Y are shown. The B-H curve of the permanent magnet material Y is the same as that shown in FIG. 5.

As shown in FIG. 6, the coercive force of the permanent magnet materials W and Y is the same. However, the magnetic flux density of the permanent magnet material W is larger than that of the permanent magnet material Y. When the armature reaction does not exist, the operation point of the auxiliary poles 5 is located at point J, where the magnetic flux density of the permanent magnet material W is B2. The critical point K of the permanent magnet material W is located right from the critical point C of the permanent magnet material Y.

If counter magnetic field –H2 due to the maximum armature reaction of the rotary electric machine 1 is applied, the operation point of the auxiliary poles 5 made of the permanent magnet material W passes the critical point K and comes to a point L. Accordingly, the operation point of the auxiliary poles 5 would not return to the point J but goes right to a point M along a line L-M that is parallel to the line K-J. The point M is an intersected point of the permeance line P and the line L-M. The magnetic flux density at this point is B3 that is smaller than B2. In other words, there is an irreversible demagnetization of a flux density that is a difference B2–B3 in the auxiliary poles 5. However, after the demagnetization, the B-H characteristic curve M-L-T of the auxiliary poles 5 provides better performance than the curve A-C-T that can sufficiently suppress the magnetic leakage of the main poles 4. Thereafter, the B-H characteristic curve of the auxiliary poles 5 would not change however often they are applied the counter magnetic field H2.

The auxiliary poles 5 are made of the permanent magnet material W that has a larger magnetic flux density than a predetermined value that is sufficient to suppress the leakage magnetic flux of the main poles 2 even if it is exposed to a maximum armature reaction and irreversibly demagnetized. Therefore, the output power of the rotary electric machine 1 can be prevented from lowering.

On the other hand, the magnitude of the counter magnetic field due to the maximum armature reaction applied to the main poles 2 is smaller than the magnitude of the counter magnetic field of the maximum armature reaction applied to the auxiliary poles 5, as shown in FIG. 9. Accordingly, the main poles 2 can use less expensive material than the permanent magnet 18 material W that is used for the auxiliary poles 5 without reducing the magnetic flux density of the main poles 2 to a lower value than the predetermined value after demagnetization due to the maximum armature reaction. In this case, the auxiliary poles 5 can suppress the magnetic leakage of the main poles without increasing the cost, so that the output power of the rotary electric machine 1can be maintained.

As a variation, soft magnetic materials 9 (soft iron) can be inserted between the main poles 2 and the auxiliary poles 5.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotary electric machine having a plurality of permanent magnet main poles disposed on an inner periphery of a yoke at equal intervals in the circumferential direction and a plurality of auxiliary poles respectively disposed between neighboring two of said main poles via magnet fixing members, wherein said magnet fixing member comprises a U-bent elastic metal plate having a base wall and a pair of circumferentially opposite side walls for providing an auxiliary pole space, wherein each of said side walls has an edge bent in a circumferential direction opposite to each other, an elastic retaining member separated from said edge for pressing said auxiliary poles radially outward and an elastic projection at an axially middle portion of said edge for pressing said auxiliary pole radially outward when said auxiliary pole is inserted into said auxiliary pole space after opening said elastic retaining member radially inward in an axial direction.

2. The rotary electric machine according to claim 1, wherein said elastic projection comprises a convex portion of said edge that projects toward said base wall.

3. The rotary electric machine according to claim 1 or 2, wherein said base wall has a plurality of outside supporting portions for supporting said auxiliary pole that is pressed radially outward by said elastic projection.

4. The rotary electric machine according to claim 3, wherein said outside supporting portion is formed from a portion that is cut and bent radially inward from said base wall.

5. The rotary electric machine according to claim 1, wherein said elastic retaining member has a stopper for retaining an axial end surface of said auxiliary pole that is disposed in said auxiliary pole space.

6. The rotary electric machine according to claim 1, wherein said stopper comprises an axial end of said elastic retaining member that is curled toward said base wall.

7. A U-bent magnetic fixing spring for a magnetic pole comprising:

a base wall with a plurality of outer periphery supporting portions cut out from said base wall;

a pair of side walls extending from said base wall that each have respective bent edge portions facing each other, wherein axially opposite ends of said bent edge portions form radially swingable elastic retaining members;

stoppers formed from axial ends of said radially swingable elastic retaining members curled toward said base wall; and elastic projections comprised of a convex portion formed on each respective bent edge portion.

8. The U-bent magnetic fixing spring for a magnetic pole of claim 7, wherein said convex portion is further formed at a middle of each respective bent edge portion.

* * * * *